of Patent: Feb. 28, 1995

United States Patent [19]

Hooykaas

[11] Patent Number: 5,393,342
[45] Date of Patent: Feb. 28, 1995

[54] CEMENT COMPOSITION AND METHOD FOR THE PREPARATION THEREOF

[75] Inventor: Carel W. J. Hooykaas, Rotterdam, Netherlands

[73] Assignee: Pelt & Hooykaas B.V., Rotterdam, Netherlands

[21] Appl. No.: 224,079

[22] Filed: Apr. 6, 1994

Related U.S. Application Data

[63] Continuation of Ser. No. 64,410, May 19, 1993, abandoned.

[30] Foreign Application Priority Data

May 25, 1992 [NL] Netherlands ................ 9200921
Jun. 19, 1992 [NL] Netherlands ................ 9201083

[51] Int. Cl.$^6$ ............................................ C04B 7/14
[52] U.S. Cl. ........................... 106/714; 106/767; 106/789
[58] Field of Search ............... 106/714, 739, 767, 789, 106/790, 782, 780

[56] References Cited

U.S. PATENT DOCUMENTS

| | | | |
|---|---|---|---|
| 1,816,988 | 8/1931 | Potts | 106/714 |
| 1,823,928 | 9/1931 | Bjorkman | 106/714 |
| 4,318,744 | 3/1992 | Dodson | 106/714 |
| 4,981,519 | 1/1991 | Fukaya et al. | 106/789 |

FOREIGN PATENT DOCUMENTS

| | | | |
|---|---|---|---|
| 2102685 | 8/1970 | France . | |
| 2626041 | 2/1977 | Germany | 106/714 |
| 0169958 | 9/1984 | Japan | 106/714 |
| 0048472 | 3/1986 | Japan | 106/767 |
| 7111093 | 2/1972 | Netherlands . | |
| 0026683 | of 1903 | United Kingdom | 106/767 |
| 0000218 | of 1904 | United Kingdom | 106/767 |
| 0015765 | of 1907 | United Kingdom | 106/767 |
| 0903331 | 2/1982 | U.S.S.R. | 106/714 |
| 1031942 | 7/1983 | U.S.S.R. | 106/714 |

OTHER PUBLICATIONS

World Patent Index-Derwent Abstract-JP61048460 "Utilization of Steel Prodn. Slag Involves Cooling Molten Slag With Air, Adding Water Granulated Blast Furnace Slag, Cement, and/or Cement Clinker" (Mar. 10, 1986).
Chem. Abstr. vol. 92, No. 6, Feb. 1980, No. 46337t, Aleksandrov.
Chemical Abstract-"Use of Steel Manufacturing Slag", JP6148448 (Mar. 10, 1986).
Chemical Abstract-"Slag Cement Having High Early Strength", JP01126246 (May 18, 1989).
Chemical Abstract-"Binder Based Upon Cement Clinker and Converter Slag", Aleksandrov et al. Stroit Mater. vol. 9, p. 25 (Russia). No date.

*Primary Examiner*—Mark L. Bell
*Assistant Examiner*—Paul Marcantoni
*Attorney, Agent, or Firm*—Levine & Mandelbaum

[57] ABSTRACT

The invention relates to a cement composition which can be hardened hydraulically and which consists of ground cement clinker material, granulated blast furnace slags and comminuted steel slags. The comminution of the steel slags is preferably carried out by grinding, in particular to a particle size of at most 0.2 mm and expediently to 0.09 mm. The ground steel slags have a Blaine value of at least 400 m$^2$/kg, expediently 473 m$^2$/kg, and a weight per unit volume of 2,800–4,000 kg/m$^3$. The steel slags are chosen from air-cooled steel slags, foamed steel slags, granulated steel slags or a combination thereof. A method is also described for the preparation of a cement composition which can be hardened hydraulically, in which method cement clinker material and ground, granulated blast furnace slags are mixed with ground steel slags at normal or elevated temperature and pressure, the obtained mixture is cooled if desired, and comminuted to obtain a hydraulically hardenable cement composition. Use is made of a cement furnace if the present cement composition is prepared at an elevated temperature. Preferably a mixture of blast furnace slag cement and ground steel slags containing up to 30% of steel slags, or a mixture of Portland cement and ground steel slags containing up to 50% of steel slags is formed.

14 Claims, No Drawings

CEMENT COMPOSITION AND METHOD FOR THE PREPARATION THEREOF

This application is a continuation of application Ser. No. 08/064,410, filed on May 19, 1993, now abandoned.

BACKGROUND OF THE INVENTION

The invention relates to a cement composition based on ground cement clinker material and ground, granulated blast furnace slags and also comprising steel slags, and to a method for the preparation thereof by mixing the two first mentioned components with comminuted steel slags.

PRIOR ART

Cement compositions have already been known for a long time and are subdivided into various quality grades, based on the strength achieved under standardised conditions. Various types of cement exist, such as Portland cement and blast furnace slag cement.

Portland cement is formed from the composite raw materials in a rotary furnace at a temperature of about 1450° C. with the formation of the cement clinker as semi-finished product. The cement clinker is, however, much too coarse to be able to react with water at a reasonable rate. However, the surface area and with that the reactivity become sufficiently high on fine grinding in ball mills. In order also to achieve a favourable course of hardening when water is added to the cement composition, up to 5% gypsum is often added to the clinker during fine grinding.

Blast furnace slag cement consists of a mixture of ground, granulated blast furnace slags and ground Portland cement clinker and usually also contains up to 5% gypsum.

It is pointed out that it is generally known to convert iron products obtained from a blast furnace into steel in a converter, for example by blowing through oxygen. During this operation a steel slag is formed which, however, has disadvantages for practical use since it is difficult to process after solidification since it first has to be broken down in order to obtain particles of suitable size. For this reason, steel slags were virtually only processed as filler in a road construction material.

Further, it is pointed out that an inorganic hydraulically-setting binder consisting of cement clinker material and steel slags is known from S. E. Aleksandrov, Stroitel'nye Materialy, 1979, (9), 25. It was found that such a binder had a shorter setting time when the amount of steel slags was raised, compared with a binder consisting of cement clinker material and blast furnace slags.

Surprisingly, a cement composition has now been found which just has a longer setting time and can also give after hardening a product having a better strength.

The cement composition according to the invention is based on ground cement clinker material and ground, granulated blast furnace slags, and is characterized in that the composition further partly consists of comminuted steel slags.

The use of steel slags is further known from Chem. Abstr. vol. 104, nr. 26, June 30, 1986, abstract nr. 229557a. According to this disclosure, the steel slags are nevertheless firstly fused together with granite, thereafter cooled with water and pulverized to obtain pellets. These pellets are nevertheless especially designed for the iron processing industry. Such a product cannot be used as an inorganic hydraulic setting binder, such as the present cement composition, due to its low strength.

NL-A-7111093 discloses a binder consisting of granulated blast furnace slags plus steel slags, in which the steel slags, due to their high content of combined CaO, can act as an initiator for the hydraulically acting blast furnace slag sand.

In the cement composition according to the invention, on the contrary, the action of the granulated blast furnace slags is initiated by the (Portland) cement clinker material.

A mixture of ground steel slags and blast furnace slags is also known from Chem. Abstr., vol. 112, nr. 2, Jan. 8, 1990, abstract nr. 11226k, but here again the cement clinker fraction is missing in the produced material.

At last, it is known from FR 2.102,685 to use steel slags as a catalyst-accelerator in a mixture known as "grave laitier". "Grave laitier" consists of a mixture of coarse ground stone and granulated blast furnace slags. Here also the cement clinker material as used according to the invention, is missing.

BRIEF SUMMARY OF THE INVENTION

The cement composition according to the invention is based on ground cement clinker material and ground, granulated blast furnace slags, and is characterized in that the composition further partly consists of comminuted steel slags. The action of the granulated blast furnace slags is initiated by the (Portland) cement clinker material.

The invention is not restricted to the use of air-cooled, comminuted steelslags. Any foamed steel slag or granulated steel slag can also be used advantageously. Such slags can moreover be finely ground requiring less grinding energy.

Preferably, the steel slags are comminuted by grinding, in particular to a particle size of at most 0.2 mm, preferably at most 0.1 mm and expediently up to 0.09 mm. Such a particle size is advantageous since the commercially available cement powder usually has a particle size of up to $\pm 140\mu$, as a result of which an intimate mixture can be formed on mixing the two constituents.

The ground steel slags used according to the invention in a cement composition are expediently essentially freed from iron. Iron is usually present in the form of ferrites. The removal of iron is effected in a simple manner by applying a magnetic field and provides a fraction which has a high ferrite content and a fraction which has a low ferrite content. The fraction with the high ferrite content can be re-used as such in the blast furnace for the preparation of pig iron.

Preferably, the ground steel slags have a Blaine value of at least 400 $m^2$/kg, preferably at least 450 $m^2$/kg. It is pointed out that the Blaine value for cement is about 400, depending on its quality.

The weight per unit volume of the ground steel slags is expediently 2,800 to 4,000 $kg/m^3$ and in particular about 3,300 $kg/m^3$.

The invention also relates to a method for the preparation of a cement composition which can be hardened hydraulically and comprises at least cement clinker material and ground, granulated blast furnace slags, which is characterized in that cement clinker material and ground, granulated blast furnace slags are mixed with ground steel slags at normal or elevated temperature and pressure, the obtained mixture is cooled, if desired, and comminuted to obtain a hydraulically hardenable cement composition.

The present cement composition is thus based on a combination of cement clinker material and ground, granulated blast furnace slags. Therefore, blast furnace cement or Portland cement are preferably used as starting materials.

It has been found experimentally that optimum results can be obtained using a mixture of blast furnace slag cement and ground steel slags which contains up to about 30% steel slags, and using a mixture of Portland cement and ground steel slags which contains up to 50% steel slags.

It is pointed out that the presence of the steel slags leads to a delay in the formation of cement setting. However, a delay in general leads to a higher strength and is therefore highly desirable. Since the ground steel slag itself already results in delayed hardening, no, or in any case less, gypsum has to be added to the cement composition. This constitutes an appreciable advantage in the long term. This is because the presence of gypsum (calcium sulphate) in cement can lead to the formation of ettringite. It is known that hardened concrete which contains ettringite can display crack formation if it comes into contact with sulphate-containing water. This crack formation occurs as a result of expansion of the ettringite. The absence of gypsum overcomes this problem.

It is further pointed out that blast furnace cement consists of a mixture of (35–85%) granulated blast furnace slags and Portland cement clinker, a composition which is effective in practice for an end product of high strength, consisting of two parts of granulated blast furnace slags to one part of cement clinker. By now partially replacing the blast furnace slags and Portland clinker to be used for the production of the cement by finely ground steel slags, a cement is obtained which, it is true, hardens somewhat more slowly, but for which the strength obtained after hardening for 28 days is appreciably higher.

Thus, according to the invention a cement clinker material can be formed using an intimate mixture of the raw materials customary for Portland cement clinker as well as ground steel slags as the starting material. On the other hand, it is also possible first to form a mixture of ground steel slags and ground, granulated blast furnace slags and to treat this mixture with conventional clinker raw materials in a cement furnace in order to obtain a cement according to the invention. The temperature of said furnace can then be as used for the preparation of clinker material, so up to about 1400° C.

However, it is also possible first to prepare a mixture of clinker raw materials and ground, granulated blast furnace slags and to treat this mixture at elevated temperature with the addition of ground steel slags, expediently also in a cement furnace, at the usual operating conditions.

A preferred embodiment of the invention comprises forming a cement composition by treating an intimate mixture of essentially equal amounts of ground steel slags, ground, granulated blast furnace slags and cement clinker raw materials at elevated temperature and subjecting the resulting product to fine grinding after cooling.

Mixing of the several components of the present cement composition can thus be effected at a temperature between room temperature and about 1400° C.

Preferably, ground steel slags are used which have a weight per unit volume of 2,800 to 4,000 $kg/m^3$, preferably about 3,300 $kg/m^3$, and a Blaine value of at least 400 $m^2/kg$ and preferably 473 $m^2/kg$.

The particle size of the ground steel slags is at most 0.2 mm, preferably up to 0.1 mm and expediently up to 0.09 mm.

It is pointed out that the invention is not restricted to the use of ground steel slags cooled in the air. Any foamed or granulated steel slag can advantageously be used requiring, moreover, less grinding energy for the fine grinding of such slags.

The invention is illustrated in more detail by reference to the following examples, provided solely by way of illustration.

EXAMPLE 1

Steel slags from a steel converter were cooled in air, and ground, in a manner known per se. A powder having the following analysis results was thus obtained.

| ANALYSIS RESULTS FOR STEEL SLAG POWDER | |
| --- | --- |
| Property | Result |
| Composition* (% m/m): | |
| CaO | 43.7 |
| $SiO_2$ | 18.3 |
| $Fe_2O_3$ | 18.9 |
| $Al_2O_3$ | 2.4 |
| MgO | 3.1 |
| $Na_2O$ | 0.15 |
| $K_2O$ | 0.05 |
| $Cl^-$ | 0.28 |
| Loss on ignition (952° C.) | 3.9 |
| Insoluble matter (HCl) | 9.7 |
| Mass per unit volume ($kg/m^3$) | 3314 |
| Blaine ($m^2/kg$)** | 473 |

*total content expressed as oxides, digestion in acid
**Blaine value of cement (depending on the quality) about 400 $m^2/kg$.

Although this steel slag powder contains a somewhat high amount of $SiO_2$ and a somewhat low amount of $Na_2O$, this was found to be no drawback whatsoever when the powder was used in a cement composition, as can be seen from the results of a study on various mixtures of blast furnace slag cement and Portland cement using the steel slag powder shown above:

| | | RESULTS OF STUDY ON MIXED CEMENTS | | | | | | |
| --- | --- | --- | --- | --- | --- | --- | --- | --- |
| Property | Unit | Blast furnace slag cement | 90/10 (a) | Portland cement | 80/20 (b) | 60/40 (c) | 40/60 (d) | Requirement in accordance with NEN 3550 |
| WCF (water-cement factor) | % m/m | 27.8 | 26.6 | 24.7 | 22.3 | 21.2 | 20.1 | — |
| Standard consistency | mm | 7 | 7 | 5 | 7 | 4 | 5 | — |
| Start of setting | min | 240 | 280 | 175 | 245 | 238 | 240 | >60 |
| End of setting | min | 285 | 330 | 200 | 275 | 265 | 280 | — |

-continued

RESULTS OF STUDY ON MIXED CEMENTS

| Property | Unit | Blast furnace slag cement | 90/10 (a) | Portland cement | 80/20 (b) | 60/40 (c) | 40/60 (d) | Requirement in accordance with NEN 3550 |
| --- | --- | --- | --- | --- | --- | --- | --- | --- |
| Dimensional stability | mm | 0.5 | 1 | 1.5 | 1 | 3.5 | 2.7 | <10 |
| Tensile bending strength: | | | | | | | | |
| 1 day | MPa | 0.90 | 0.83 | 2.00 | 1.59 | 1.16 | 0.36 | — |
| 3 days | MPa | 3.7 | 4.0 | 3.2 | 3.9 | 3.1 | 1.7 | — |
| 7 days | MPa | 4.5 | 6.4 | 4.5 | 4.9 | 4.2 | 2.7 | — |
| 28 days | MPa | 8.4 | 8.8 | 6.8 | 6.5 | 5.8 | 3.9 | — |
| Compression strength: | | | | | | | | |
| 1 day | MPa | 3.0 | 2.6 | 7.6 | 5.6 | 3.8 | 1.3 | — |
| 3 days | MPa | 15.0 | 16.6 | 16.2 | 18.0 | 13.2 | 6.1 | ≧11 |
| 7 days | MPa | 30.0 | 31.4 | 24.8 | 27.7 | 19.3 | 11.4 | — |
| 28 days | MPa | 44.8 | 48.2 | 39.8 | 34.2 | 28.4 | 17.3 | ≧35 and ≦65 |

(a): mixture of 90 parts of blast furnace slag cement + 10 parts of ground steel slags;
(b): mixture of 80 parts of Portland cement + 20 parts of ground steel slags;
(c): mixture of 60 parts of Portland cement + 40 parts of ground steel slags;
(d): mixture of 40 parts of Portland cement + 60 parts of ground steel slags.

It can be seen from the above results that the addition of ground steel slags to blast furnace slag cement delays setting by about 40 min., and in the case of addition to Portland cement delays setting by about 65 min. As yet, the delay in setting in the case of addition to Portland cement does not appear to be dependent on the amount added.

It can be seen from the values found for the tensile bending strength and the compression strength that the use of ground steel slags provide a cement composition of outstanding quality.

EXAMPLE 2

The same steel slag powder as in Example 1, finely ground to a particle size of about 0.09 mm, was used as a starting material.

The steel slag powder was mixed with the raw materials customary for Portland cement clinker, the amount of steel slags added being about 25% of the total amount of blast furnace slags present in blast furnace slag cement, and treated at a temperature of about 1400° C. in a cement furnace. After cooling, the steel-slag cement clinker thus obtained was finely ground and mixed with ground, granulated blast furnace slags in order to obtain a cement composition.

The properties of the material obtained after hardening of this cement composition show good comparison with those of blast furnace slag cement: the material according to the invention shows a somewhat delayed incipient hardening, but the compression strength obtained after hardening for 28 days is higher.

Repeating the above experiment but using an amount of steel slags of about 50%, calculated with respect to the amount of granulated blast furnace slags, led to essentially the same result.

EXAMPLE 3

Example 2 was repeated, but ground, granulated blast furnace slags were also supplied to the cement furnace in an amount of 10%. The cement formed using the product obtained has an outstanding tensile bending strength and compression strength after hardening for 28 days.

EXAMPLE 4

An intimate mixture of equal amounts of ground, granulated blast furnace slags and ground steel slags was formed in a ball mill. The mixture thus obtained was baked at a temperature of about 1100° C. and, after cooling, was finely ground and mixed with a finely ground cement clinker, in order to obtain a cement composition.

The properties of the cement composition obtained are comparable with those of blast furnace slag cement.

What is claimed is:

1. A cement composition consisting of ground Portland cement clinker material, ground, granulated blast furnace slags, and comminuted steel slags having a particle size no greater than 0.2 mm.

2. A cement composition according to claim 1, wherein the steel slags are chosen from air-cooled steel slags, foamed steel slags, granulated steel slags, or a combination of these slags.

3. A cement composition according to claim 1, wherein the steel slags are comminuted by grinding.

4. Cement composition according to claim 1, wherein the steel slags have a particle size no greater than 0.1 mm.

5. A cement composition according to claim 1, wherein iron has been removed from the ground steel slags.

6. A cement composition according to claim 1, wherein the ground steel slags have a Blaine value of at least 400 m²/kg.

7. A cement composition according to claim 1, wherein the ground steel slags have a weight per unit volume of 2,800–4,000 kg/m³.

8. A method for the preparation of a cement composition which can be hardened hydraulically wherein Portland cement clinker material and ground, granulated blast furnace slags are mixed with ground steel slags having a particle size no greater than 0.2 mm at a temperature between 15° C. and 1400° C. to obtain a hydraulically hardenable cement composition consisting of said ground Portland cement clinker material, ground, granulated blast furnace slags, and comminuted steel slags.

9. A method according to claim 8, wherein the steel slags are mixed with blast furnace cement or Portland cement.

10. A method according to claim 8, wherein a mixture of blast furnace slag cement and ground steel slags is formed which contains up to 30% of steel slags.

11. A method according to claim 8, wherein a mixture of Portland cement and ground steel slags is formed which contains up to 50% of steel slags.

12. A method according to claim 8, wherein ground steel slags which have a weight per unit volume of less than 4,000 kg/m$^3$ and a Blaine value of at least 400 m$^2$/kg are used.

13. A method according to claim 8, wherein as said steel slags, air-cooled steel slags, foamed steel slags, and/or granulated steel slags are used.

14. A method according to claim 8, wherein the ground steel slags have a particle size no greater than 0.1 mm.

* * * * *